United States Patent
Yadgar et al.

(10) Patent No.: US 10,096,873 B2
(45) Date of Patent: Oct. 9, 2018

(54) PROTECTED ANODE STRUCTURE SUITABLE FOR USE IN METAL/AIR BATTERIES

(71) Applicant: PHINERGY LTD., Lod (IL)

(72) Inventors: Avraham Yadgar, Kiryat Ono (IL); Yisrael Miller, Bat Yam (IL); Dekel Tzidon, Hod Hasharon (IL)

(73) Assignee: PHINERGY LTD., Lod (IL)

( * ) Notice: Subject to any disclaimer, the term of this patent is extended or adjusted under 35 U.S.C. 154(b) by 199 days.

(21) Appl. No.: 14/770,939

(22) PCT Filed: Feb. 26, 2014

(86) PCT No.: PCT/IL2014/050195
§ 371 (c)(1),
(2) Date: Aug. 27, 2015

(87) PCT Pub. No.: WO2014/132251
PCT Pub. Date: Sep. 4, 2014

(65) Prior Publication Data
US 2016/0013529 A1 Jan. 14, 2016

Related U.S. Application Data

(60) Provisional application No. 61/770,335, filed on Feb. 28, 2013.

(51) Int. Cl.
*H01M 12/06* (2006.01)
*H01M 2/16* (2006.01)
(Continued)

(52) U.S. Cl.
CPC ....... *H01M 12/065* (2013.01); *H01M 2/1646* (2013.01); *H01M 2/1653* (2013.01);
(Continued)

(58) Field of Classification Search
CPC .. H01M 2/1646; H01M 2/1653; H01M 4/463; H01M 12/06; H01M 12/065
(Continued)

(56) References Cited

U.S. PATENT DOCUMENTS 3,915,748 A 10/1975 Weidlich
4,053,685 A 10/1977 Rowley et al.
(Continued)

FOREIGN PATENT DOCUMENTS

| CA | 849132 A | 11/1970 |
|---|---|---|
| EP | 0690520 A1 | 1/1996 |
| WO | WO 2014/057483 A1 | 4/2014 |

OTHER PUBLICATIONS

International Search Report for PCT Application No. PCT/IL2014/050195 dated Jun. 24, 2014.
(Continued)

*Primary Examiner* — Basia A Ridley
*Assistant Examiner* — James M Erwin
(74) *Attorney, Agent, or Firm* — Pearl Cohen Zedek Latzer Baratz LLP

(57) ABSTRACT

A metal/air electrochemical cell comprising at least one air cathode, an alkaline electrolyte and at least one anode component, wherein the anode component is in the form a spatial body bounded by a surface consisting of two opposite parallel bases and lateral sides, with said lateral sides being provided thereon with a protective member comprising a resilient polymer seal.

15 Claims, 5 Drawing Sheets

(51) Int. Cl.
  *H01M 4/12* (2006.01)
  *H01M 4/46* (2006.01)
  *H01M 4/02* (2006.01)

(52) U.S. Cl.
  CPC ............ *H01M 4/12* (2013.01); *H01M 4/463* (2013.01); *H01M 12/06* (2013.01); *H01M 2004/027* (2013.01)

(58) Field of Classification Search
  USPC ........................................................ 429/404
  See application file for complete search history.

(56) References Cited

U.S. PATENT DOCUMENTS

| | | | |
|---|---|---|---|
| 4,414,293 A | | 11/1983 | Joy et al. |
| 4,564,570 A | | 1/1986 | Gordon |
| 4,950,561 A | * | 8/1990 | Niksa ...................... H01M 2/08 |
| | | | 429/404 |
| 5,049,457 A | | 9/1991 | Niksa et al. |
| 5,712,061 A | | 1/1998 | Spak et al. |
| 8,142,938 B2 | | 3/2012 | Khasin et al. |

OTHER PUBLICATIONS

Supplementary European Search Report for European Application No. 14757372.9 dated Jul. 13, 2016.

* cited by examiner

PROTECTED ANODE STRUCTURE SUITABLE FOR USE IN METAL/AIR BATTERIES

CROSS-REFERENCE TO RELATED APPLICATIONS

This application is a National Phase Application of PCT International Application No. PCT/IL2014/050195, International Filing Date Feb. 26, 2014, claiming priority of U.S. Provisional Application Ser. No. 61/770,335, filed Feb. 28, 2013, which are hereby incorporated by reference.

FIELD OF THE INVENTION

The present invention relates to an improved structure of metallic anodes used in metal/air electrochemical cells, allowing longer work time of the anodes and minimizing the extent of useless, parasitic reactions which may occur in the electrochemical cell.

BACKGROUND OF THE INVENTION

Air batteries show promising capabilities as high energy density electrochemical power sources. In its most general form, the operation of a metal/air electrochemical cell is based on the reduction of oxygen, e.g., atmospheric oxygen, which takes place at the cathode, and the oxidation of metallic anode. The aqueous electrolyte present in the cell is a highly alkaline solution, e.g., highly concentrated potassium hydroxide solution. A structure of a metal/air battery is schematically depicted in FIG. 1, in which the air cathode, the consumable metallic anode and the electrolyte are shown.

A commonly used air cathode consists of (i) an electronically conductive screen, an expanded foil or a metallic foam which serves as a current collector, (ii) active electrode particles provided within the current collector (including a catalyst for promoting the reduction of oxygen) and (iii) hydrophobic porous film (PTFE, Teflon®) supported on one face of said screen or foil. The two opposing faces of the air cathode are exposed to the atmosphere and the alkaline electrolyte, respectively. The air cathode is permeable to air, while its external face is hydrophobic and impermeable to the aqueous electrolyte.

The anode immersed in the electrolyte is made of metals such as aluminum, zinc, magnesium, iron and alloys thereof. When aluminum anode is used, then the cell is a primary cell. In the case of zinc anode, both primary and secondary cells are known.

For example, the discharge reaction for air/aluminum cell is as follows:

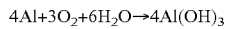

$4Al + 3O_2 + 6H_2O \rightarrow 4Al(OH)_3$

Recharging of the cell is effected by replacing the spent aluminum anode after it has been substantially consumed in the cell reaction with a fresh anode.

In its most general form, the anode applied in metal/air batteries can be defined as a spatial body bounded by a surface consisting of two opposite parallel sides (hereinafter the bases") and lateral sides lying in planes which are typically perpendicular to the bases (hereinafter the lateral sides"). Usually, the anode has a polyhedral surface; the anode is plate-shaped, with the dimensions of the bases being, for example, from 5.0-5.0 cm*cm to 30-30 cm*cm, and a thickness ranging from 0.3 to 4.0 cm.

In use, the anode is placed in the electrochemical cell such that the bases of the anode are parallel to the active faces of the air cathodes. The bases of the anode constitute the electrochemically active areas on which the discharge and charge reactions take place. However, in addition to the desired electrochemical reactions, the anode may react directly (i.e., chemically) with the alkaline electrolyte present in the cell. The undesired chemical oxidation of the anode is chiefly due to two factors.

First, while an air battery is being charged or discharged, the lateral sides of the anode are prone to direct chemical reaction with the caustic electrolyte, leading to a useless, parasitic reaction that lowers the overall cell efficiency. The hydrogen gas which evolves as a result of the reaction may further decrease the voltage of the cell as the electrolyte conductivity decreases.

Second, when the operation of the battery is halted by the user (e.g., when the electrical vehicle in which the battery is mounted is not in motion), it is usually recommended to drain out the electrolyte of the cell compartment. It has been observed that the electrolyte cannot be completely removed from the cell compartment, and some caustic electrolyte residues are trapped in the gap between the anode plate and the casing of the cell, i.e., on the lateral sides of the anode plate. These small "electrolyte islands" which remain on the surface of the lateral sides of the anode continue to react with the anode material. The reaction is expected to proceed until the hydroxyl ions in the "electrolyte islands" are entirely consumed.

U.S. Pat. No. 4,414,293 describes parasitic corrosion-resistant anode for use in metal/air cells where the edges of the anode, i.e., the non-electrochemically active faces of the anode, are coated with a thin film of a metal which is inert in the alkali environment of the cell. The thin metal protective film, e.g., nickel, silver or gold, is deposited on the edges of the anode by electrolysis techniques.

U.S. Pat. No. 4,564,570 describes an edge seal for consumable metal anodes, especially lithium. The seal consists of a brittle polymer coating. It is reported in U.S. Pat. No. 4,564,570 that severe edge corrosion was observed when lithium anode coated on its peripheral edges with a rubbery-like plating material was exposed to an aqueous electrolyte.

SUMMARY OF THE INVENTION

The goal of this invention is to provide an anode configuration capable of reducing the useless corrosion processes set out above. It should be noted that the aluminum/air battery described above in reference to FIG. 1 is considered herein as an example only. The novel anode structure provided by the invention, which is described in detail below, is suitable for use in numerous metal-air batteries (e.g., based on aluminum, zinc, magnesium and iron) which can be applied in electric vehicles, portable electronics, drones and other applications, including dual cell configurations where the anode is positioned in the space between two cathodes as set forth below.

It has now been found that it is possible to minimize, or significantly suppress, the attack of the alkaline electrolyte on the lateral sides of the anode in electrochemical cells by the application of a resilient polymer onto said lateral sides, such that when the anode is tightly fixed in place and pressed against the walls of the electrochemical cell, the resilient polymer applied onto the lateral surface of the anode acts as an effective seal which minimizes electrolyte flow across the lateral surface. The term "resilient polymer" is used herein to describe homopolymers as well as copolymers (including terpolymers), exhibiting resilience: the ability to stretch and retract rapidly, or the ability to undergo a change in shape under load (compression) and return to about its original shape, namely, rubbers or elastomers. Hereinafter, the word "rubber" is used to describe naturally occurring and synthetic polymers (the latter polymers are also called "elastomers").

The resilient polymer of choice is preferably a foam rubber (also known as sponge rubber). Foam rubbers generally fall into three groups: closed cell, open cell or semi-closed cell. The experimental results reported below indicate that closed cell or semi-closed cell foam rubber, for example, closed cell or semi-closed cell ethylene-propylene-diene monomer (EPDM), combining sufficient flexibility and resiliency with good sealing capability, is especially suitable for use as a resilient polymer seal for the anode. The EPDM protective member applied onto the lateral surface of the anode acts as a barrier which is impermeable or nearly impermeable to the aqueous electrolyte, thereby preventing or minimizing the undesired oxidation of the anode by the electrolyte.

Accordingly, one aspect of the invention relates to a metal/air electrochemical cell comprising at least one air cathode, an alkaline electrolyte and at least one anode component, preferably an aluminum anode, wherein the anode component is in the form a spatial body bounded by a surface consisting of two opposite parallel bases and lateral sides, with said lateral sides being provided thereon with a protective member comprising a resilient polymer seal.

Another aspect of the invention is a process for fabricating a metal/air electrochemical cell which comprises a housing, at least one air cathode, an anode spaced apart from the cathode, and an alkaline electrolyte in the space between said cathode and anode, comprising applying a protective member in the form of a resilient polymer seal in the gap between the lateral sides of said anode and the walls of said housing. It should be noted that the rubber may be either applied onto the lateral surface of the anode (e.g., by adhesive etc.), following which the rubber-coated anode is placed in the housing, or alternatively, the rubber may be affixed within the cell frame, against which the exposed anode is pressed.

The invention also relates to an aluminum anode for use is an aluminum/air electrochemical cell, said anode being a spatial body bounded by a surface consisting of two opposite parallel bases and four lateral sides lying in planes which are essentially perpendicular to the bases, e.g., a plate-like anode, characterized in that a rubber, especially a foam rubber, for example, closed cell or semi-closed cell EPDM rubber, is applied on at least a portion of said lateral sides of the anode, and preferably over the entire lateral sides of said anode, to protect said lateral sides from being oxidized by an alkaline electrolyte. For example, when intended for use in electric vehicles powered by aluminum/air batteries with alkaline electrolyte, the area of each of the two bases of the plate-like anode is from 25 cm$^2$ to 1600 cm$^2$, preferably from 150 cm$^2$ to 300 cm$^2$, more preferably from 200 cm$^2$ to 300 cm$^2$, and the thickness of the anode is from 0.5 cm to 5 cm, preferably from 0.5 cm to 2 cm, more preferably from 0.7 cm to 1.3 cm. The thickness of the rubber (non-compressed, i.e., in the absence of a load) applied on the lateral surface of the anode is from 0.5 to 7 mm, preferably from 1.5 mm to 7 mm, more preferably from 3 to 5 mm.

The inventors have also found that the resistance of an aluminum anode to the unwanted parasitic oxidation reaction taking place in aluminum/air battery can be increased by the application onto the lateral sides of the anode a protective member in the form of a surface coating comprising epoxy resins or fluropolymer resins. Such surface coatings, which provide alternative to the resilient polymer seal, constitute further aspects of the invention.

DETAILED DESCRIPTION OF THE INVENTION

The protective member preferably extends over not less than 60%, (e.g., not less than 70%) of the lateral, non-electrochemically active faces of the anode, and most preferably over the entire non-electrochemically active faces. The protective member is preferably compatible with the electrolyte, namely, it is chemically inert in alkaline environment; it neither dissolves nor disintegrates within the cell under the working conditions prevailing in the cell during operation (e.g., an alkaline environment, elevated temperature, charge or discharge products). The protective member preferably forms good contact with the anode surface to prevent delamination or electrolyte seeping beneath said member. The protective member can be made of materials with high or medium surface energy, but low surface energy materials promoting electrolyte repulsion can also be used.

Some aspects of the invention shall now be described in reference to FIGS. 2 to 5. This set of Figures demonstrate an anode utilizable in an electrochemical cell where a single anode is positioned between a pair of spaced apart cathodes, i.e., the anode has two parallel opposite sides (bases) which are both electrochemically active, facing the cathodes.

FIG. 2 shows a perspective view of the metal anode 1. The anode is generally a plate with a rectangular or square shape and with dimensions as set forth above. The bases of the plate which constitute the electrochemically-active faces of the anode are indicated by numeral 2. The lateral, non-electrochemically active faces of the anode plate are indicated by numeral 3. A tab 4 which serves for current collection is connected to the body of the anode. FIG. 3 is again a perspective view of anode 1, this time with a protective member 5 extending over the entire lateral surface of the anode 1.

FIG. 4a illustrates a side view of an electrochemical cell 6 utilizing the anode of the invention, and FIG. 4b is a sectional view of the cell, taken along line F-F of FIG. 4a. Anode 1 is symmetrically positioned in the space between two cathodes 7, 8 placed in parallel to one another. By way of example, the distance between the active faces of the spaced apart anode 1 and cathode 7 (and similarly, anode 1 and cathode 8) is from 1 mm to 100 mm. A description of the structure of suitable cathodes, namely air cathodes, can be found, for example, in U.S. Pat. No. 8,142,938 and in co-assigned PCT/IL2013/000076. An alkaline electrolyte solution 9, such as aqueous potassium hydroxide with concentration of 20 to 45 wt %, flows in the space between the electrodes, across the actively faces of the electrodes which are parallel to one another. The lateral sides of the anode, which are perpendicular to the electrochemically-active faces of the electrodes and are hence non-electrochemically active, are provided with the a rubbery protective member 5.

FIG. 5a is a side view of an encased anode and FIG. 5b is a sectional view of the encased anode taken along line E-E of FIG. 5a, showing anode 1 encased within a cell frame 10 enclosed with a cap 11. For example, when the non-metallic protective member 5 is EPDM foam, its thickness, in a non-compressed state, is from 0.5 to 5 mm. When tightly affixed within the cell frame 10, the thickness of the rubbery protective member 5 reduces to about 10 to 70% of its original thickness, preferably displaying not less than 50% reduction in thickness.

For example, when the contemplated use is for powering electric vehicles, a plurality of electrochemical cells as shown in FIG. 4 are stacked together to form a battery which is further equipped with conventional components utilized in metal/air batteries, such a liquid container for holding the electrolyte, pipes and pumps for circulating the electrolyte, a cooling unit and a vent, etc.

As noted above, the protective member 5 comprises a resilient polymer which is compressed by the walls of the cell to form a seal. The resilient polymer is preferably a rubber displaying reduction in thickness of 50% upon application of a compressive force in the range from 30 $g/cm^2$ to 300 $g/cm^2$. More preferred are foam rubbers which turn into a seal when compressed to 50% under a load in the range from 50 $g/cm^2$ to 250 $g/cm^2$. The seal may act as a mechanical seal, e.g., a gasket which would fill the space between the lateral sides of the anode and the walls of the cell. Resilient polymers which are especially suitable for use as seal materials for the lateral surface of the anode are foam rubbers, preferably closed or semi-closed cell foam rubbers. The resilient polymer consists of a compressible (e.g., spongy) foam rubber and is commercially available in a laminated form comprising adhesive tapes, e.g., pressure sensitive adhesive film, the sticky side of which is placed on the metal surface. The thickness of the (non-compressed) foam rubber may vary from 0.5 mm to 5 mm. The chosen thickness of the foam rubber generally depends on the chemical stability of the seal with respect to the electrolyte, as well as mechanical requirements. The foam rubber will behave as an O-ring as it is compressed between the anode compartment walls and the anode material, such that even if the pressure sensitive adhesive film dissolves with the passage of time, the foam material will still remain intact. Various types of rubbers, including EPDM (e.g., closed-cell or semi-closed cell sponge EPDM), polybutadiene, polychloroprene (known as neoprene rubber), polyisoprene (called natural synthetic rubber), Butyl (copolymer of isobutylene and isoprene), NBR, styrene-butadiene (called SBR), Santoprene, thermoplastic elastomers, silicone rubbers, fluorosilicones, Viton, Kalrez, PTFE, RTV (room temperature vulcanization), MS-polymer are suitable for use according to the invention.

As noted above, it has also been found that the lateral, non-electrochemically reactive surface of the anode can be protected against parasitic attack of the electrolyte by the application onto the lateral sides of the anode a protective member in the form of a surface coating comprising epoxy resins or fluoropolymer resins. Different coating techniques may be employed for this purpose, depend on the nature of the coating material, such as spraying or brushing. It should be noted that the coating may be applied on the lateral sides of the anodes directly, without first treating the anode surface. However, in some cases such surface treatment may be beneficial, in order to improve the adhesion between the metal and the coating applied thereon. The treatment of the lateral sides of the anode may include surface roughening, either by means of chemical or mechanical pitting; an addition of surface adhesive promoters or activators; or surface oxide or nitride formation. It is also noted that the protective member may sometimes extend onto the perimeter of the bases of the anode. In such cases, the width of the margins of the bases having the barrier applied thereon should be not more than 3 mm.

According to one embodiment, the protective member is in the form of water repellent coating comprising one or more fluorine-containing polymers, e.g., Teflon® family materials such as polytetrafluroethylene (PTFE), fluorinated ethylene propylene copolymer (FEP) and perfluroalkoxy polymer (PFA). This type of coating can be formed on the surface of the lateral sides of the anode by means of using fluorine-containing polymers in the form of a dispersion, e.g., an aqueous dispersion. For example, FEP particles suspended in water, such as PEP dispersion TE-9568 (available from DuPont) may be used. A thin layer of the dispersion is applied onto the surface, e.g., by means of a brush, followed by air drying and then curing at a suitable temperature. For example, when the fluorine-containing polymer is FEP, then the curing temperature is about 270° C.-280° C. and the curing period is not less than 10 minutes.

According to another embodiment of the invention, the protective member is in the form of an electrically conductive coating, consisting of paintable polymers comprising carbon or metallic particles, oxides or nitrides thereof, or mixtures of such particles, to improve the electrical contact resistance with the cell casing or the anodic current collector. This type of coating can be formed on the surface of the lateral sides of the anode by means applying a suitable conductive paint onto the surface with a brush, forming a coating which is 25 to 100 microns thick.

EXAMPLES

Example 1

Epoxy Polymer Coating

Figure 1:
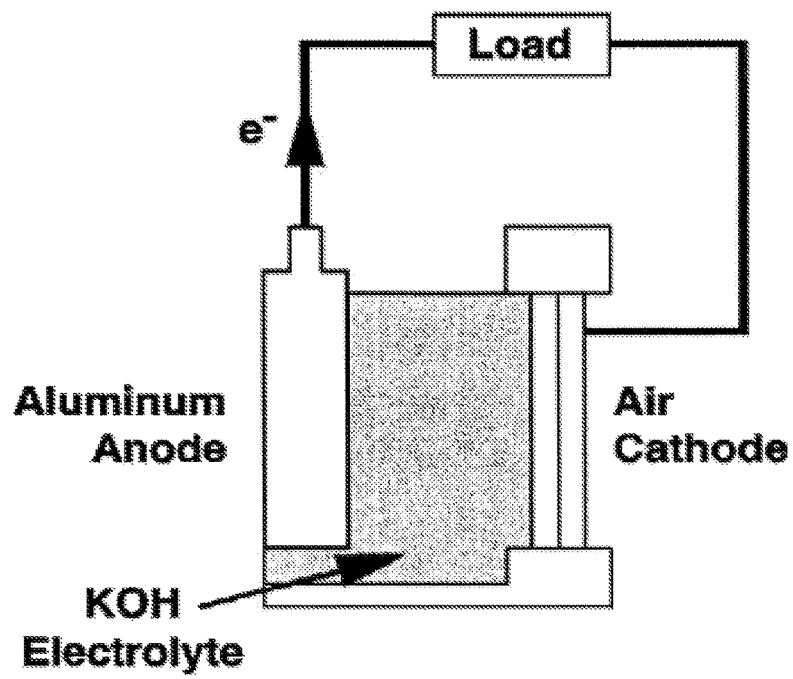
FIG. 1 is a schematic illustration of a metal/air cell.
Figure 2:
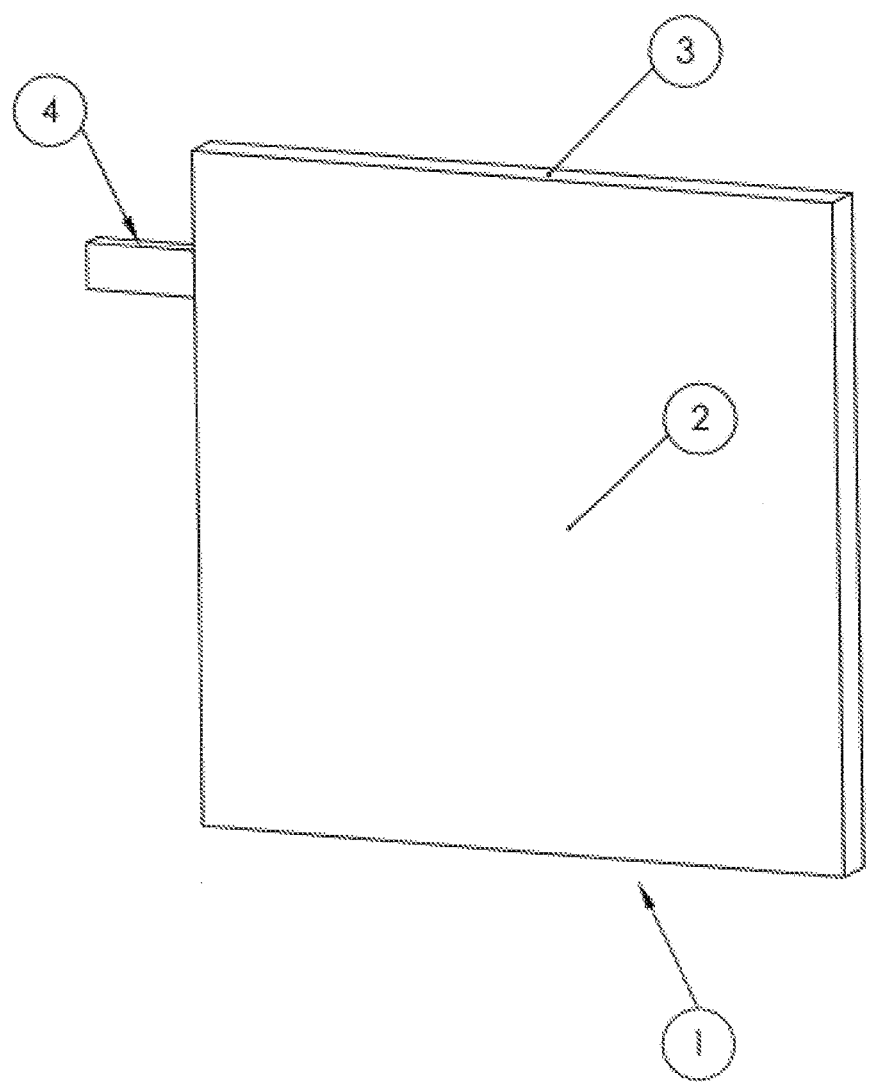
FIG. 2 is a perspective view of a metal anode.
Figure 3:
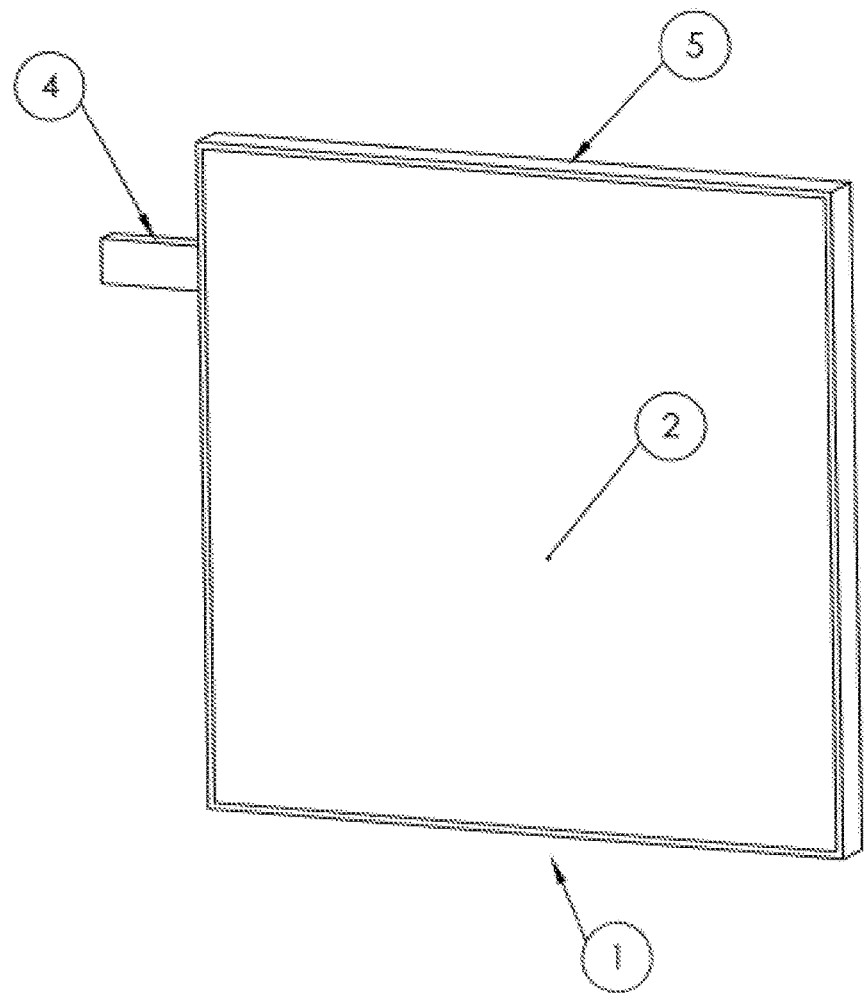
FIG. 3 is a perspective view of a metal anode comprising a protective member applied onto its lateral surface.
Figures 4A, 4B:
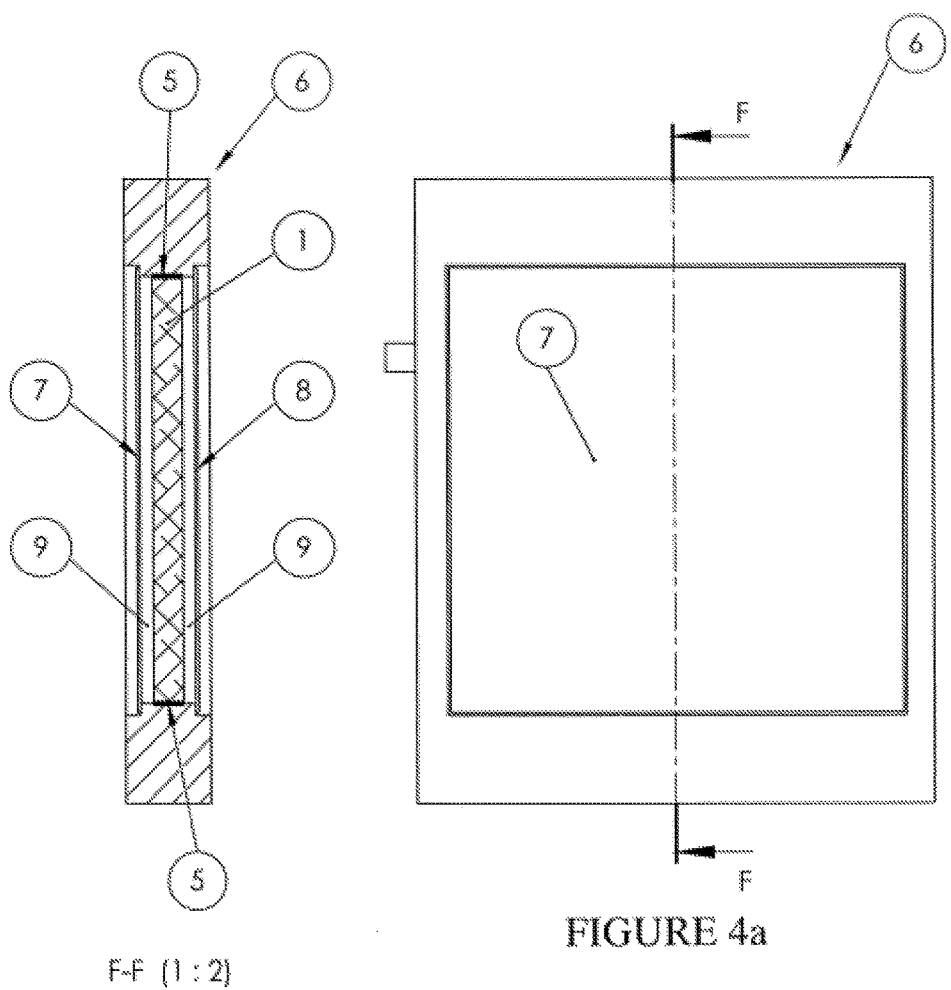
FIGS. 4a and 4b show a metal/air cell with an anode positioned in the space between two spaced apart cathodes.
Figures 5A, 5B:
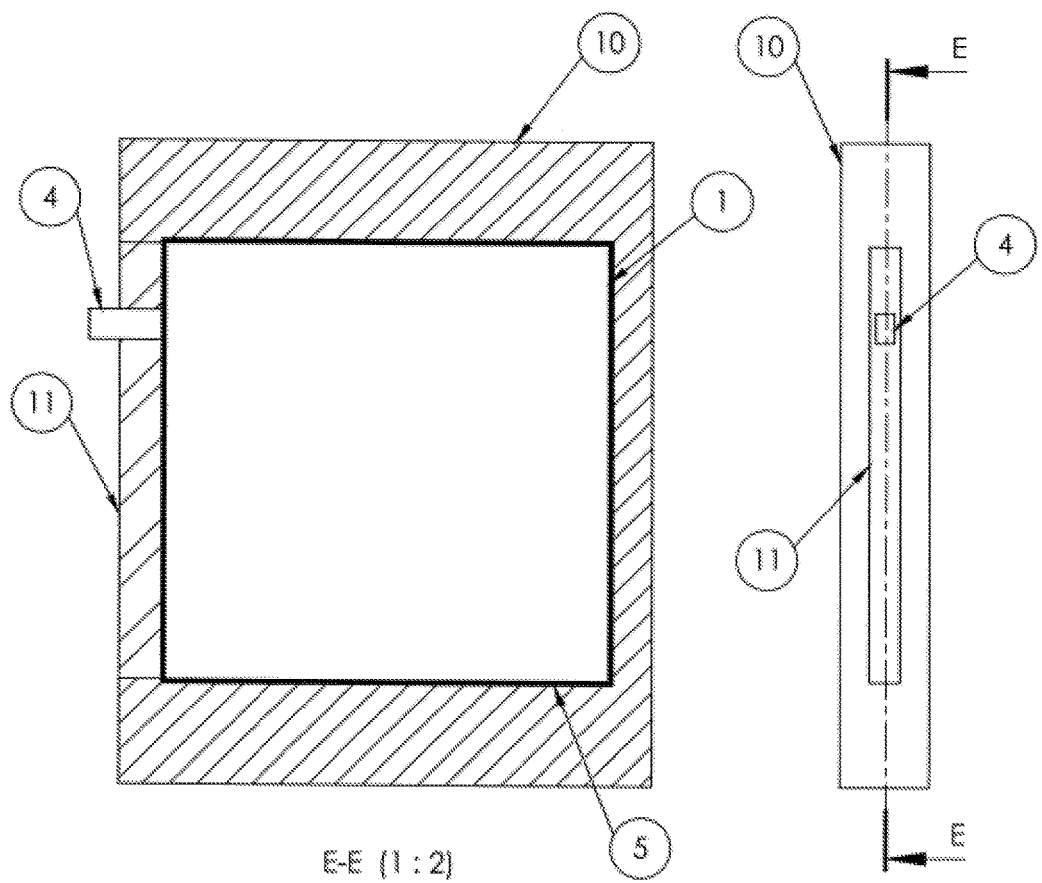
FIGS. 5a and 5b show the anode of the invention encased within a cell compartment.

A zinc plate is cut to the size of 15.5 cm by 15.5 cm. The thickness of the plate is 0.5 cm. Each of the four lateral sides of the plate is rubbed with sand paper grade 0 to increase surface area and expose fresh zinc. The plate is washed in isopropanol to remove all grease and particles from the surface, and is then completely dried with an air fan.

Epoxy DP270 from 3M is applied onto the lateral sides of the zinc plate, such that the overall thickness of the epoxy coating is roughly 300 microns. The plate is then hung by means of suitable clumps on a rope, allowing the epoxy to cure for 90 minutes, to the gel point. The plate is then placed in an oven at 60° C. for 2-3 hours.

The zinc plate may then incorporated into a rechargeable zinc/air battery.

Example 2

Sponge Tape Coating

An aluminum plate, consisting of 97.5 wt % aluminum and 2.5 wt % magnesium (the level of purity of the metals being 99.99% and 99.99%, respectively), is cut to the size of 15.5 cm by 15.5 cm. The thickness of the plate is 1 cm.

The plate is washed in isopropanol to remove all grease and particles from the surface and then completely dried by means of an air fan. An EPDM foam tape of 1 cm width produced by Nitto Denko-EPT sealer ee-1010EP is firmly fastened to the lateral sides of the plate and 2 kg pressure is applied to each side for 1 minute to ensure good adhesion.

Example 3

Conductive Polymer Coating

An aluminum plate, consisting of 97.5 wt % aluminum and 2.5 wt % magnesium (the level of purity of the metals being 99.99% and 99.99%, respectively), is cut to the size of 15.5 cm by 15.5 cm. The thickness of the plate is 1 cm.

The lateral sides of the plate are treated with sodium hydroxide solution as follows. A cotton cloth is dipped in 1 Molar NaOH solution. The lateral sides of the metal plate and the margins of its bases (1 mm width) are wiped with that piece of cloth, applying a thin layer of NaOH onto the treated surfaces. The NaOH is left on the surface to react with the metal for a period of 3 minutes. The plate is then immersed in doubly distilled water for 30 seconds to remove the NaOH, and then immersed in an isopropanol bath for 30 seconds. The plate is dried with an air fan.

The coating process is carried out in a hood. The treated area of the plate, consisting of the lateral sides and the perimeter of the bases is wiped with a precut sponge that that is dipped in Acheson conductive coating 109B. The coating is about 200 microns thickness. The plate is left to air dry for 30 minutes and then transferred to a 70° C. oven for 1 hour. The coating is repeated once again to ensure a pinhole free coating and again air dried for 30 minutes and placed in a 70° C. oven for 1 hour.

Example 4

Hydrophobic Polymer Coating

An aluminum plate, consisting of 97.5 wt % aluminum and 2.5 wt % magnesium (the level of purity of the metals being 99.99% and 99.99%, respectively), is cut to the size of 15.5 cm by 15.5 cm. The thickness of the plate is 1 cm.

The lateral sides of the plate are rubbed with a sand paper grade 0 to increase surface area and expose fresh aluminum. The lateral sides of the plate are treated with sodium hydroxide solution as follows. A cotton cloth is dipped in 1 Molar NaOH solution. The lateral sides of the metal plate and the margins of its bases (1 mm width) are wiped with that piece of cloth, applying a thin layer of NaOH onto the treated surfaces. The NaOH is left on the surface to react with the metal for a period of 3 minutes. The plate is then immersed in doubly distilled water for 30 seconds to remove the NaOH, and then immersed in an isopropanol bath for 30 seconds. The plate is dried with heated air fan.

The treated area of the plate, consisting of the lateral sides and the perimeter of the bases is wiped with a precut porous sponge that is dipped in FEP TE-9568 (fluorinated ethylene propylene) emulsion produced by Dupont. The coating is about 150 microns thickness. The plate is left to air dry for 30 minutes and then transferred to a 270° C. oven for 0.5 hour. The coating is repeated once again to ensure a pinhole free coating and again air dried 30 minutes and placed in a 270° C. oven for 0.5 hour.

Examples 5 (of the Invention) and 6 (Comparative)

Aluminum/Air Battery

The anode of Example 2 was tested in an exemplary aluminum/air cell.

The anode is symmetrically positioned in the space between a pair of air cathodes (electrodes E-4 commercially available from Electric Fuel Corporation, Israel)), which are placed parallel to each other at a distance of about 15 mm from one another, such that the catalyst side of each air cathode is facing the aluminum anode. The electrodes arrangement is mounted within a plastic housing, such that the sides of the air cathodes having the PTFE porous film provided thereon face the air inlet openings.

The electrolyte used is an aqueous solution of potassium hydroxide (350 gram/L). The electrolyte is stored in a suitable tank. Typical electrolyte volume is determined by the desired working resource of the system, e.g., approximately 1 L for 500-600 Ah. The Electrolyte is forced to flow in the space between the air cathodes and the aluminum anode at a flow rate 0.05-0.1 L/min under pressure generated by a diaphragm pump. The working temperature was 45° C. The current drawn from the cell is about 100 mA/cm$^2$, at voltage 1.0-1.3V.

The amount of hydrogen gas that is liberated due to the chemical reaction between the aluminum anode and the electrolyte is measured with a gas flow meter [Aalborg GFM-17]. The volume of hydrogen produced is used to calculate the fraction of the aluminum which underwent the useless oxidation reaction.

The experiment set out above was repeated, but this time the anode used was a regular aluminum anode with no coating applied onto its lateral sides. The results of both experiments are tabulated in Table 1.

TABLE 1

| Example | Type of anode | Temperature | Current density | Aluminum utilized |
|---------|---------------|-------------|-----------------|-------------------|
| 5 | With coated lateral sides | 45° C. | 100 mA/cm$^2$ | 95% |
| 6 | With non-coated lateral sides | 45° C. | 100 mA/cm$^2$ | less than 90% |

The invention claimed is:

1. A metal/air electrochemical cell comprising a housing having walls, at least one air cathode, an alkaline electrolyte and at least one anode component, wherein the anode component is in the form a spatial body bounded by a surface consisting of two opposite parallel bases and lateral sides, wherein:
    a protective member in the form of a resilient polymer is applied in a gap between each of said lateral sides of said anode and the walls of said housing, wherein said protective member extends over not less than 60% of said lateral sides.

2. A metal/air electrochemical cell according to claim 1, wherein the resilient polymer comprises a foam rubber.

3. A metal/air electrochemical cell according to claim 2, wherein the foam rubber is closed cell or semi-closed cell foam rubber.

4. A metal/air electrochemical cell according to one of claim 2 or 3, wherein the foam rubber is EPDM foam.

5. A metal/air electrochemical cell according to claim 1, wherein the resilient polymer is a rubber displaying reduction in thickness of 50% upon application of a compressive force in the range from 30 g/cm² to 300 g/cm².

6. A metal/air electrochemical cell according to claim 1, wherein the anode is an aluminum anode.

7. A process for fabricating a metal/air electrochemical cell which comprises a housing having walls, at least one air cathode, an anode having lateral sides spaced apart from the cathode, and an alkaline electrolyte in the space between said cathode and anode, the process comprising applying a protective member in the form of a resilient polymer in a gap between each of the lateral sides of said anode and the walls of said housing, wherein said protective member extends over not less than 60% of said lateral sides.

8. An aluminum anode for use in aluminum/air electrochemical cell, said anode being a spatial body bounded by a surface consisting of two opposite parallel bases and four lateral sides lying in planes which are essentially perpendicular to the bases, characterized in that a protective member in the form of a resilient polymer is applied on at least a portion of each of said lateral sides of the anode, to protect said lateral sides from being oxidized by an alkaline electrolyte, wherein said protective member extends over not less than 60% of said lateral sides.

9. An aluminum anode according to claim 8, wherein the resilient polymer is a foam rubber.

10. An aluminum anode according to claim 9, wherein the foam rubber is selected from the group consisting of closed-cell or semi-closed cell EPDM foam.

11. An aluminum anode according to claim 8 for use in electric vehicles powered by aluminum/air batteries, wherein the area of each of the two bases of the anode is from 150 to 300 cm², the thickness of the anode is from 0.5 to 2.0 cm and the thickness of the resilient polymer, which extends over the entire lateral sides of said anode, is from 1.5 to 7 mm when in a non-compressed state.

12. An aluminum anode according to claim 9 for use in electric vehicles powered by aluminum/air batteries, wherein the area of each of the two bases of the anode is from 150 to 300 cm², the thickness of the anode is from 0.5 to 2.0 cm and the thickness of the rubber, which extends over the entire lateral sides of said anode, is from 1.5 to 7 mm when in a non-compressed state.

13. An aluminum anode according to claim 10 for use in electric vehicles powered by aluminum/air batteries, wherein the area of each of the two bases of the anode is from 150 to 300 cm², the thickness of the anode is from 0.5 to 2.0 cm and the thickness of the rubber, which extends over the entire lateral sides of said anode, is from 1.5 to 7 mm when in a non-compressed state.

14. The metal/air electrochemical cell of claim 1, wherein each of said lateral sides are being provided thereon with a protective member comprising said resilient polymer or wherein said resilient polymer is affixed within said housing.

15. The process of claim 7, wherein each of said lateral sides are being provided thereon with a protective member comprising said resilient polymer or wherein said resilient polymer is affixed within said housing.

* * * * *